United States Patent
Lopez et al.

(10) Patent No.: US 10,129,643 B2
(45) Date of Patent: Nov. 13, 2018

(54) AUTONOMOUS VEHICLE INGRESS AND EGRESS

(71) Applicant: Ford Global Technologies, LLC, Dearborn, MI (US)

(72) Inventors: Jose Lopez, Dearborn, MI (US); Deborah Fogt, Grosse Ile, MI (US); Erick Michael Lavoie, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 5 days.

(21) Appl. No.: 15/342,288

(22) Filed: Nov. 3, 2016

(65) Prior Publication Data

US 2018/0124515 A1   May 3, 2018

(51) Int. Cl.
| | | |
|---|---|---|
| *H04B 1/00* | (2006.01) | |
| *H04R 3/12* | (2006.01) | |
| *G06F 3/16* | (2006.01) | |
| *H04R 5/02* | (2006.01) | |
| *H04R 5/04* | (2006.01) | |
| *H04S 7/00* | (2006.01) | |

(52) U.S. Cl.
CPC .............. *H04R 3/12* (2013.01); *G06F 3/165* (2013.01); *H04R 5/02* (2013.01); *H04R 5/04* (2013.01); *H04S 7/303* (2013.01); *H04R 2430/01* (2013.01); *H04R 2499/13* (2013.01); *H04S 2400/13* (2013.01)

(58) Field of Classification Search
CPC .......... H04R 29/001; H04R 5/02; H04R 5/04; H04B 1/20; H04B 1/3822; H04B 1/385; H04B 2001/3866; H04B 7/18567; H04B 7/2606; G10L 15/26; G10L 15/187; G10L 13/04; G10L 15/22; G10L 15/063; G10L 15/07; G10L 2015/0638; G10L 2015/227; H04H 20/28; H04S 1/007; H04S 3/00; H04S 5/02

USPC .......... 381/86, 107–109, 389, 56–59; 700/94
See application file for complete search history.

(56) References Cited

U.S. PATENT DOCUMENTS

| | | |
|---|---|---|
| 4,660,222 A | 4/1987 | Osaka |
| 5,107,467 A | 4/1992 | Jorgensen et al. |
| 5,777,565 A * | 7/1998 | Hayashi .............. G07B 15/063 235/375 |

(Continued)

FOREIGN PATENT DOCUMENTS

| | | |
|---|---|---|
| CN | 200951733 Y | 9/2007 |
| CN | 101455602 A | 6/2009 |

(Continued)

OTHER PUBLICATIONS

UK Search Report dated Mar. 28, 2018 re GB Appl. No. 1717748.6.

*Primary Examiner* — Lao Lun-See
(74) *Attorney, Agent, or Firm* — Frank A. MacKenzie; Bejin Bieneman PLC

(57) ABSTRACT

A vehicle system includes a plurality of speakers and a processor. Each of the plurality of speakers is associated with one of a plurality of vehicle components. The processor is programmed to select at least one of the plurality of speakers to play a sound associated with one of the plurality of vehicle components and in accordance with a location of a passenger relative to at least one of the plurality of vehicle components.

20 Claims, 8 Drawing Sheets

(56) References Cited

U.S. PATENT DOCUMENTS

| | | | |
|---|---|---|---|
| 5,854,987 A * | 12/1998 | Sekine | B62D 1/28 |
| | | | 180/443 |
| 6,845,308 B2 * | 1/2005 | Kobata | H04B 1/20 |
| | | | 307/10.1 |
| 7,364,214 B2 * | 4/2008 | Park | B60J 5/101 |
| | | | 296/76 |
| 7,483,539 B2 * | 1/2009 | Stark | H04B 1/082 |
| | | | 381/123 |
| 8,442,239 B2 * | 5/2013 | Bruelle-Drews | H04B 1/3822 |
| | | | 381/109 |
| 8,606,316 B2 | 12/2013 | Evanitsky | |
| 2006/0262935 A1 * | 11/2006 | Goose | H04S 3/002 |
| | | | 381/17 |
| 2008/0037803 A1 | 2/2008 | Breed | |
| 2011/0105097 A1 * | 5/2011 | Tadayon | H04W 4/50 |
| | | | 455/418 |
| 2015/0015024 A1 | 1/2015 | Cremers et al. | |
| 2015/0086035 A1 | 3/2015 | Shin | |
| 2015/0329121 A1 * | 11/2015 | Lim | H04W 4/027 |
| | | | 701/36 |
| 2016/0039375 A1 | 2/2016 | Okuyama et al. | |
| 2016/0165031 A1 * | 6/2016 | Gopinath | H04M 1/6091 |
| | | | 455/569.2 |
| 2017/0300053 A1 * | 10/2017 | Wengreen | G05D 1/0088 |

FOREIGN PATENT DOCUMENTS

| | | |
|---|---|---|
| CN | 201890189 U | 7/2011 |
| CN | 103220594 A | 7/2013 |
| CN | 103413456 A | 11/2013 |
| DE | 10044366 A1 | 4/2002 |
| DE | 102009005260 A1 | 7/2010 |
| JP | 2007230742 A | 9/2007 |
| JP | 200973428 A | 4/2009 |
| KR | 1020150076720 | 7/2015 |
| KR | 101575437 B1 | 12/2015 |

* cited by examiner

AUTONOMOUS VEHICLE INGRESS AND EGRESS

BACKGROUND

The Society of Automotive Engineers (SAE) has defined multiple levels of autonomous vehicle operation. At levels 0-2, a human driver monitors or controls the majority of the driving tasks, often with no help from the vehicle. For example, at level 0 ("no automation"), a human driver is responsible for all vehicle operations. At level 1 ("driver assistance"), the vehicle sometimes assists with steering, acceleration, or braking, but the driver is still responsible for the vast majority of the vehicle control. At level 2 ("partial automation"), the vehicle can control steering, acceleration, and braking under certain circumstances without human interaction. At levels 3-5, the vehicle assumes more driving-related tasks. At level 3 ("conditional automation"), the vehicle can handle steering, acceleration, and braking under certain circumstances, as well as monitoring of the driving environment. Level 3 requires the driver to intervene occasionally, however. At level 4 ("high automation"), the vehicle can handle the same tasks as at level 3 but without relying on the driver to intervene in certain driving modes. At level 5 ("full automation"), the vehicle can handle almost all tasks without any driver intervention. Level 5 automation allows the autonomous vehicle to operate as a chauffeur, which is helpful for passengers who cannot otherwise operate a vehicle.

DETAILED DESCRIPTION

In addition to driving, chauffeurs of non-autonomous vehicles can help passengers enter and exit the vehicle. In an autonomous vehicle, where the passenger should sit may not always be clear. For instance, it may be preferable for the passenger to not sit in the traditional driver seat to avoid the risk of the passenger accidentally disabling the autonomous mode of operation via an inadvertent driver input. Further, some passengers, such as passengers with vision loss, may have trouble locating the vehicle, the door, the seats, etc. Without a human chauffeur present, entering and exiting the vehicle may prove frustrating.

One solution includes incorporating various speakers into various vehicle components and providing instructions to the passenger through the speakers. Additionally, or in the alternative, the vehicle may transmit instructions to the passenger's mobile device (such as a smartphone). Sounds played by the speakers or through the mobile device can help the passenger locate where to grab the door handle, where to grab an interior handle, where to step, how to find his or her seat, etc. Thus, an example vehicle system includes speakers and a processor. Each of the speakers is associated with one of a plurality of vehicle components. The processor is programmed to select at least one of the plurality of speakers to play a sound associated with one of the plurality of vehicle components and in accordance with a location of a passenger relative to at least one of the vehicle components. The location of the passenger can be determined from signals received from a mobile device or a sensor detecting a passenger at, e.g., a door of the host vehicle, etc.

The elements shown may take many different forms and include multiple and/or alternate components and facilities. The example components illustrated are not intended to be limiting. Indeed, additional or alternative components and/or implementations may be used. Further, the elements shown are not necessarily drawn to scale unless explicitly stated as such.

Figure 1:
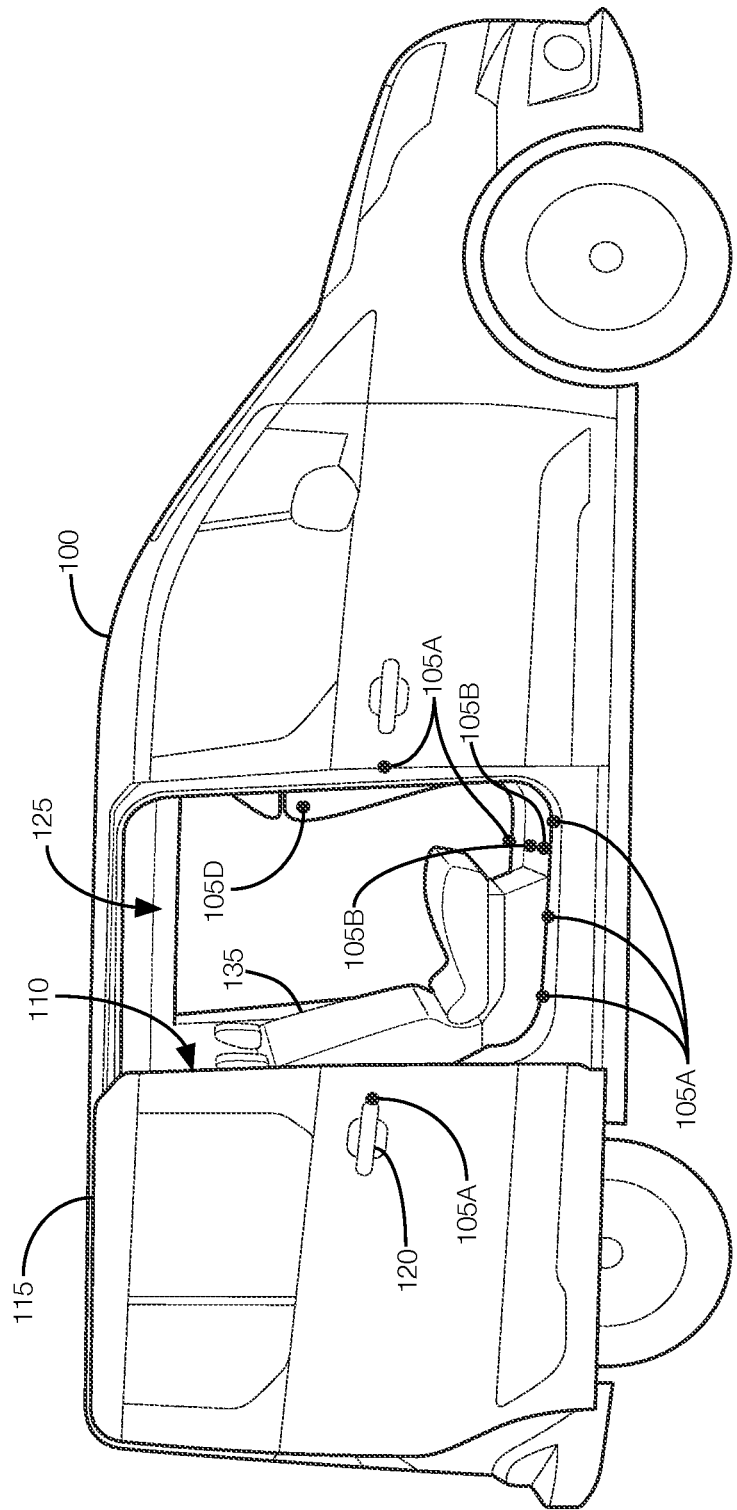
FIG. 1 illustrates an example vehicle with a system including speakers for helping passengers enter and exit the vehicle.
Figure 2:
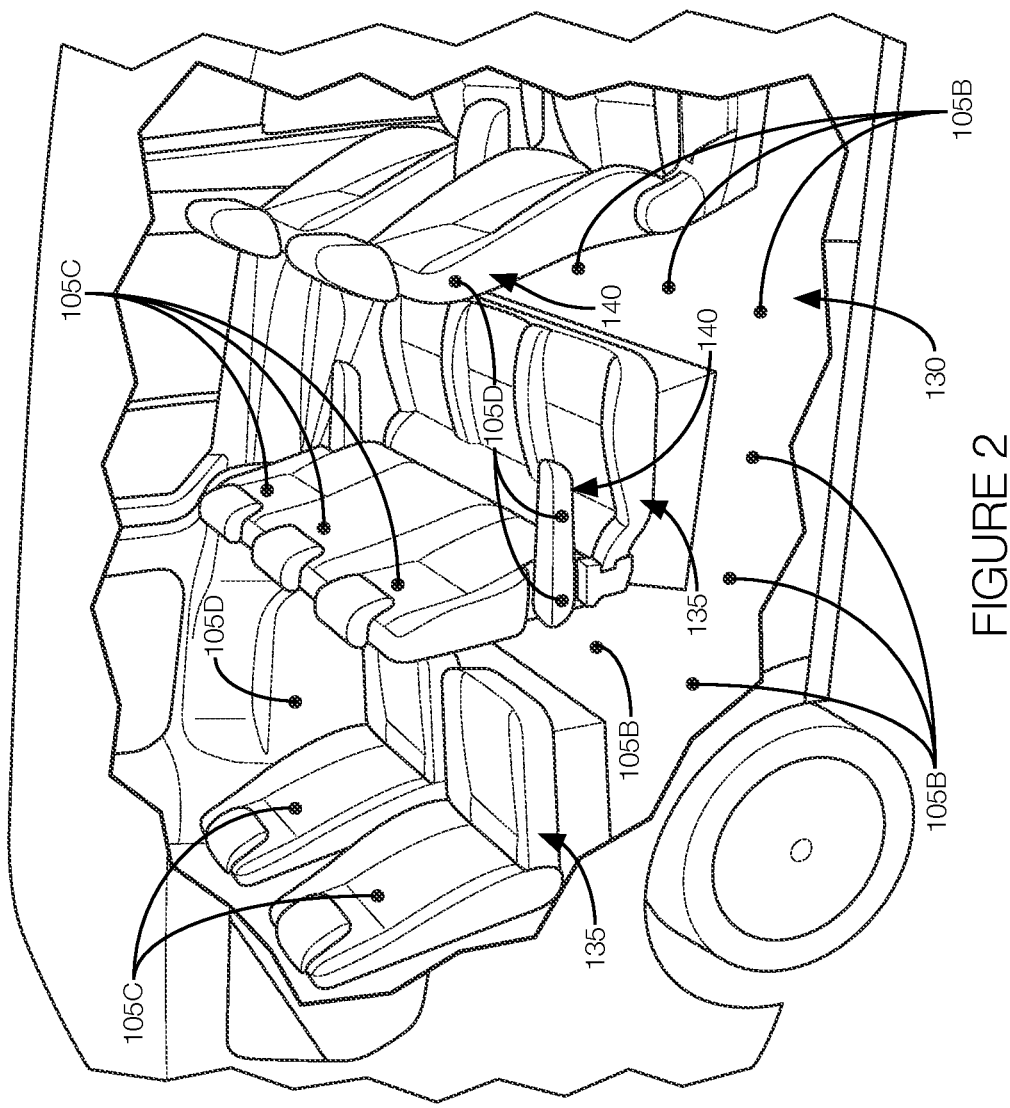
FIG. 2 illustrates a cutaway view of the vehicle with example locations of speakers incorporated into various vehicle components.

As illustrated in FIGS. 1-2, a host vehicle 100 includes components for helping passengers enter and exit the vehicle. The host vehicle 100 has multiple speakers (collectively, 105) incorporated into various vehicle components. As shown, the components include door speakers 105A, floor speakers 105B, seat speakers 105C, and interior handle speakers 105D.

The speakers are implemented via electroacoustic transducers that can convert electronic signals into sounds. The speakers may each be incorporated into, or associated with, a vehicle component. And the location of the speakers may indicate the location of the vehicle component. For instance, the door speakers 105A may be incorporated into a vehicle door 110 or components thereof, such as incorporated into, a door panel 115, an exterior door handle 120, or around a door opening 125, so that the sounds output by the door speaker 105A may be used to indicate the location of the vehicle door 110. The floor speakers 105B may be incorporated into a vehicle floor 130. The sounds played by the floor speakers 105B may indicate where a passenger should step into the host vehicle 100 and navigate to one of the seats. The seat speakers 105C may be incorporated into the vehicle seats 135. The seat speakers 105C may indicate where one or more of the vehicle seats 135 are located. The interior handle speakers 105D may be incorporated into an interior vehicle handle 140, such as a seat armrest or seat back located near the vehicle door 110, and may provide something to grab or hold onto while entering the host vehicle 100.

Certain components, as discussed below, are implemented via sensors, circuits, chips, or other electronic components that can detect the location of the passenger relative to the host vehicle 100 and play sounds through the various speakers based on where the passenger is located, requests received from the passenger's remote device, or the like. For instance, when the passenger is approaching the host vehicle 100, the door speakers 105A play a sound indicating the location of the vehicle door 110 to help the passenger find the door. If the door is closed, the sound may further help the passenger find the exterior door handle 120. If the door is open, the sound may indicate where the passenger should enter the host vehicle 100. After the passenger arrives at the door, the interior handle speakers 105D play a sound so that the passenger will know where to grab to enter the host vehicle 100. The floor speakers 105B play sounds so the passenger knows where to step. The floor speakers 105B may play sounds in a particular order. The passenger may be able to find his or her seat by following the sounds of the floor speakers 105B in the order in which they are played. The seat speakers 105C may play sounds after the passenger enters the vehicle so that the passenger knows where the seat is located or which seat to use.

In some instances, the speakers play sounds in a particular order based on where the passenger is located (e.g., outside the host vehicle 100, grabbing the interior vehicle handle 140, stepping on the floor, etc.). In another possible approach, the speakers play sounds in response to requests received from a mobile device (see FIG. 3) carried by the passenger. That is, the passenger may provide a user input (e.g., pressing real or virtual buttons) to the mobile device to indicate which part of the host vehicle 100 the passenger is trying to locate. The mobile device may generate and transmit appropriate requests to the host vehicle, and the host vehicle may respond by the appropriate speaker playing the appropriate sound, as discussed in greater detail below. Examples of mobile devices include a smartphone, a tablet computer, a laptop computer, a desktop computer, or the like.

Although illustrated as a sedan, the host vehicle 100 may include any passenger or commercial automobile such as a car, a truck, a sport utility vehicle, a crossover vehicle, a van, a minivan, a taxi, a bus, etc. The host vehicle 100 may be an autonomous vehicle that can operate in an autonomous (e.g., driverless) mode, a partially autonomous mode, and/or a non-autonomous mode.

Figure 3:
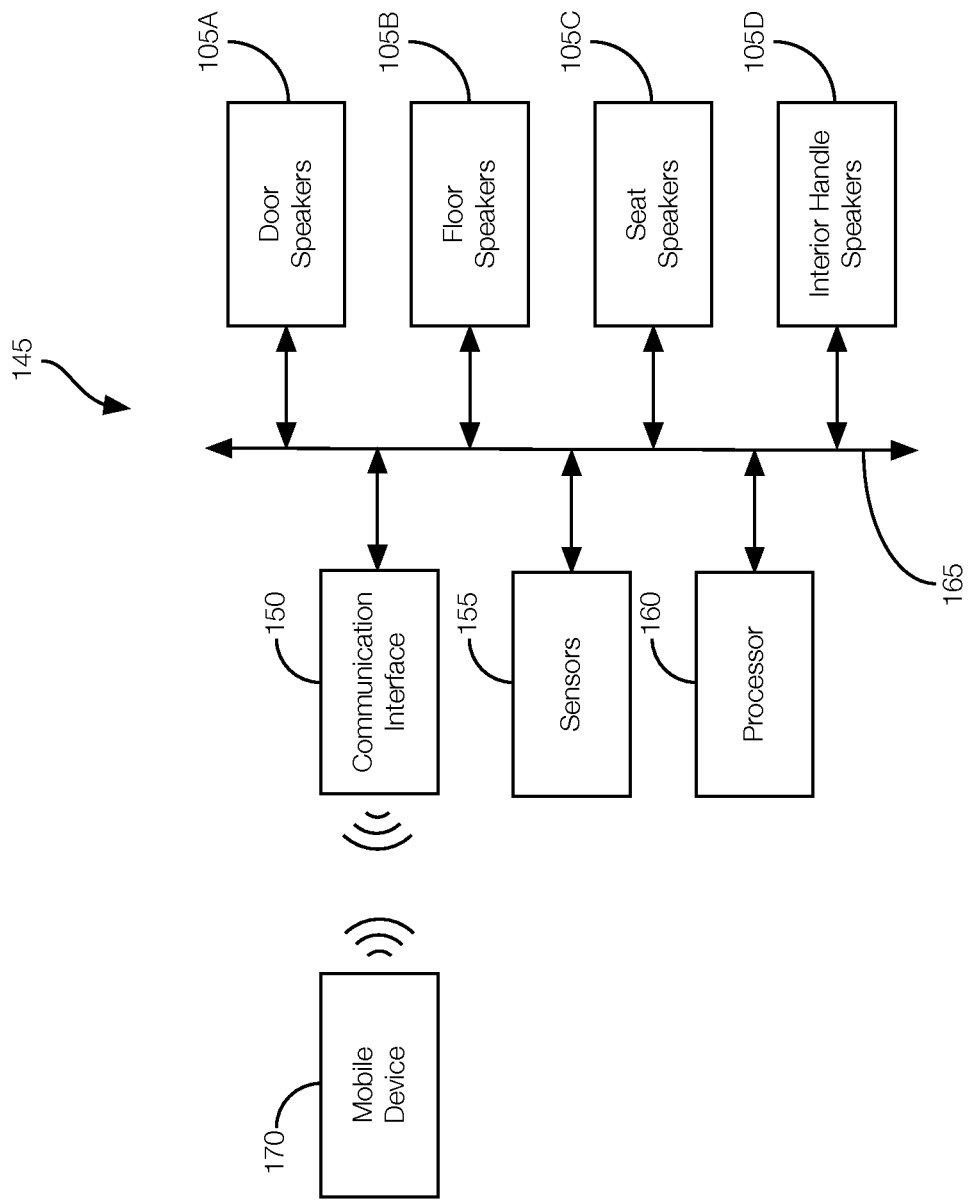
FIG. 3 is a block diagram illustrating example components of the system that help passengers enter and exit the vehicle and interface with a mobile device.

FIG. 3 is a block diagram showing example components of the host vehicle 100 that may be incorporated into or used by a system 145 for helping the passenger enter and exit the host vehicle 100. As shown, the example components include a communication interface 150, sensors 155, and a processor 160 in communication with one another and the speakers over a communication network 165. Examples of communication networks 165 include a controller area network (CAN) bus, Ethernet, Local Interconnect Network (LIN), and/or by any other wired or wireless communication links.

The communication interface 150 is implemented via antennas, circuits, chips, or other electronic components that can wirelessly communicate with the mobile device 170 and communicate over the communication network 165 with other components of the system 145 such as the sensors 155, the processor 160, the speakers, etc. The communication interface 150 may communicate with the mobile device 170 through any number of wireless communication protocols, such as Bluetooth®, WiFi, a cellular communication protocol, or the like. The communication interface 150 may be programmed to receive requests from the mobile device 170. Examples of requests may include a door request, an interior handle request, a step request, and a seat request. The communication interface 150 may be programmed to forward these and possibly other requests to the processor 160 via, e.g., the communication network 165.

The sensors 155 are implemented via circuits, chips, or other electronic components that can detect the location of a passenger relative to the host vehicle 100 or particular vehicle components and output electronic signals indicating where the passenger is located. For instance, the sensors 155 may be located through the vehicle and may output signals indicating when the passenger is approaching the vehicle, when the passenger has grabbed the exterior door handle 120, when the passenger has grabbed the interior door handle, when the passenger has stepped on the vehicle floor 130, when the passenger sits in a particular seat, when the passenger has exited the vehicle, etc. The sensors 155 may be implemented via one or more cameras, proximity sensors 155, or a combination thereof. The sensors 155 may be programmed to output the location of the passenger to the processor 160 over the communication network 165.

The processor 160 is implemented via circuits, chips, or other electronic components that can determine the location of the passenger from the signals received from the communication interface 150, the processor 160, or both. The processor 160 may be programmed to select one or more of the speakers to play a sound. The sound may be associated with one of the vehicle components. Moreover, the processor 160 may select the speakers according to a request received from the mobile device 170. For instance, in response to receiving a door request received from the mobile device 170, the processor 160 may select the door speaker 105A to play a sound associated with the vehicle door 110. In response to receiving the interior handle request, the processor 160 may select the interior handle speaker 105D to play a sound associated with the interior vehicle handle 140. In response to receiving the step request, the processor 160 may select the floor speakers 105B to play the sound associated with the vehicle floor 130. In response to receiving the seat request, the processor 160 may select the sound associated with the vehicle seat 135.

In some instances, rather than responding to requests from the mobile device 170, the processor 160 may be programmed to select speakers in a particular order. For instance, the processor 160 may be programmed to select the door speakers 105A before the interior handle speakers 105D, the interior handle speakers 105D before the floor speakers 105B, and the floor speakers 105B before the seat speakers 105C. The processor 160 may be programmed to select the next set of speakers a predetermined amount of time after selecting the preceding set of speakers or in response to signals output by the sensors 155. For instance, rather than wait the predetermined amount of time, the processor 160 may select the interior handle speakers 105D to play the sound associated with the internal vehicle handle after the sensors 155 output a signal indicating that the passenger has arrived at the door.

In some possible approaches, the processor 160 may be programmed to command the communication interface 150 to transmit the sound of the selected speaker to the mobile device 170 for playback on the mobile device 170. This may be in addition to or instead of playing the sound via the selected speaker. The processor 160 may command the communication interface 150 to transmit an adjusted sound to the mobile device 170. The processor 160 may be programmed to adjust the sound so that it reflects the distance of the mobile device 170 to the vehicle component. In other words, the sound may be adjusted to sound as if it were being played by the appropriate speaker. For instance, the processor 160 may determine a distance of the mobile device 170 relative to the vehicle component, which may be determined based on the signal strengths (such as RSSI) of communications between the mobile device 170 and the communication interface 150. The processor 160 may also or alternatively determine the distance according to the signals output by the sensors 155 since those signals indicate the location of the passenger relative to various vehicle components. In one possible approach, the processor 160 may be programmed to adjust the sounds by commanding the volume of the sound to be lower when the mobile device 170 is further away from the vehicle component and the volume of the sound to be higher when the mobile device 170 is closer to the vehicle component. Rather than transmit an adjusted sound, the processor 160 may transmit the distance measurement to the mobile device 170, via the communication interface 150, with a command for the mobile device 170 to adjust the sound according to the distance.

Figure 4:
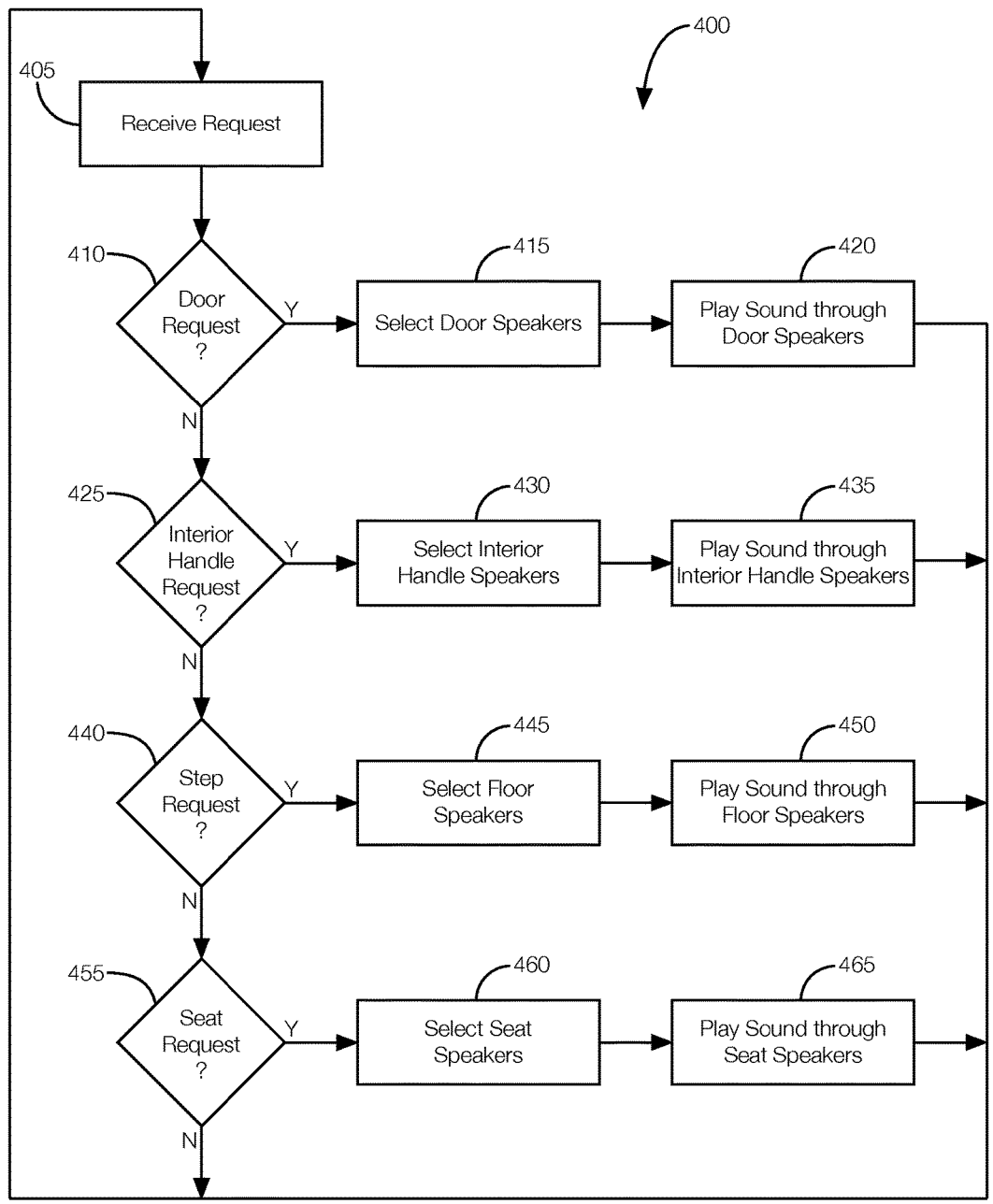
FIG. 4 is a flowchart of an example process that may be executed by the system to play particular sounds through particular speakers in response to a request received from the mobile device.

FIG. 4 is a flowchart of an example process 400 that may be executed by the system 145 to, e.g., play sounds in the host vehicle 100 at various times to help the passenger enter the host vehicle 100. The process 400 may begin prior to the passenger entering the host vehicle 100 and may continue to execute until, e.g., all passengers are seated in the host vehicle 100.

At block 405, the system 145 receives a request. The request may include a door request, an interior handle request, a step request, and a seat request. The request may be transmitted from the mobile device 170 and received at the host vehicle 100 via the communication interface 150. The communication interface 150 may forward the request to the processor 160 over the communication network 165. In some instances, instead of coming from the mobile device 170, the request is a signal output by one of the sensors 155 indicating that a passenger is located near the host vehicle 100 and would like to enter the host vehicle 100, located near one of the vehicle components 105, or the like.

At decision block 410, the system 145 determines if the request is a door request. The door request may indicate that the passenger is trying to locate the vehicle door 110. If the processor 160 determines that the request is a door request, the process 400 proceeds to block 415. Otherwise, the process 400 proceeds to block 425.

At block 415, the system 145 selects one or more of the door speakers 105A. For instance, the processor 160 may select the door speaker 105A incorporated into a door panel 115, an exterior door handle 120, around a door opening 125, or any combination thereof.

At block 420, the system 145 plays the sounds through the selected door speakers 105A. For instance, the processor 160 may output signals representing the sounds to the selected door speakers 105A, which may respond by vibrating according to the signals output by the processor 160. The process 400 may proceed to block 405 after the sounds are played through the selected door speakers 105A so that additional requests transmitted from the mobile device 170 may be received and processed.

At decision block 425, the system 145 determines if the request is an interior handle request. The interior handle request may indicate that the passenger is trying to enter the host vehicle 100 through the vehicle door 110 and would like the assistance of the interior vehicle handle 140. If the processor 160 determines that the request is an interior handle request, the process 400 proceeds to block 430. Otherwise, the process 400 proceeds to block 440.

At block 430, the system 145 selects one or more of the interior handle speakers 105D. For instance, the processor 160 may select one or more interior handle speakers 105D incorporated into an interior vehicle handle 140 located near the vehicle door 110, a seat armrest, or any combination thereof.

At block 435, the system 145 plays the sounds through the selected interior handle speakers 105D. For instance, the processor 160 may output signals representing the sounds to the selected interior handle speakers 105D, which may respond by vibrating according to the signals output by the processor 160. The process 400 may proceed to block 405 after the sounds are played through the selected interior handle speakers 105D so that additional requests transmitted from the mobile device 170 may be received and processed.

At decision block 440, the system 145 determines if the request is a step request. The step request may indicate that the passenger is ready to enter the host vehicle 100 but is unsure where to step. The step request may also indicate that the passenger is unsure how to get to his or her seat. If the processor 160 determines that the request is a step request, the process 400 proceeds to block 445. Otherwise, the process 400 proceeds to block 455.

At block 445, the system 145 selects one or more of the floor speakers 105B. For instance, the processor 160 may select one or more floor speakers 105B incorporated into the vehicle floor 130. The floor speakers 105B may be selected individually, collectively, or in a particular sequence (e.g., starting with the floor speaker 105B closest to the vehicle door 110 and ending with the floor speaker 105B closest to the passenger's vehicle seat 135).

At block 450, the system 145 plays the sounds through the selected floor speakers 105B. For instance, the processor 160 may output signals representing the sounds to the selected floor speakers 105B, which may respond by vibrating according to the signals output by the processor 160. The process 400 may proceed to block 405 after the sounds are played through the selected floor speakers 105B so that additional requests transmitted from the mobile device 170 may be received and processed.

At decision block 455, the system 145 determines if the request is a seat request. The seat request may indicate that the passenger has entered the host vehicle 100 and is trying to find his or her seat. If the processor 160 determines that the request is a seat request, the process 400 proceeds to block 445. Otherwise, the process 400 proceeds to block 405.

At block 460, the system 145 selects one or more of the seat speakers 105C. For instance, the processor 160 may select one or more seat speakers 105C incorporated into the passenger's vehicle seat 135.

At block 465, the system 145 plays the sounds through the selected seat speakers 105C. For instance, the processor 160 may output signals representing the sounds to the selected seat speakers 105C, which may respond by vibrating according to the signals output by the processor 160. The process 400 may proceed to block 405 after the sounds are played through the selected seat speakers 105C so that additional requests transmitted from the mobile device 170 may be received and processed.

Figure 5:
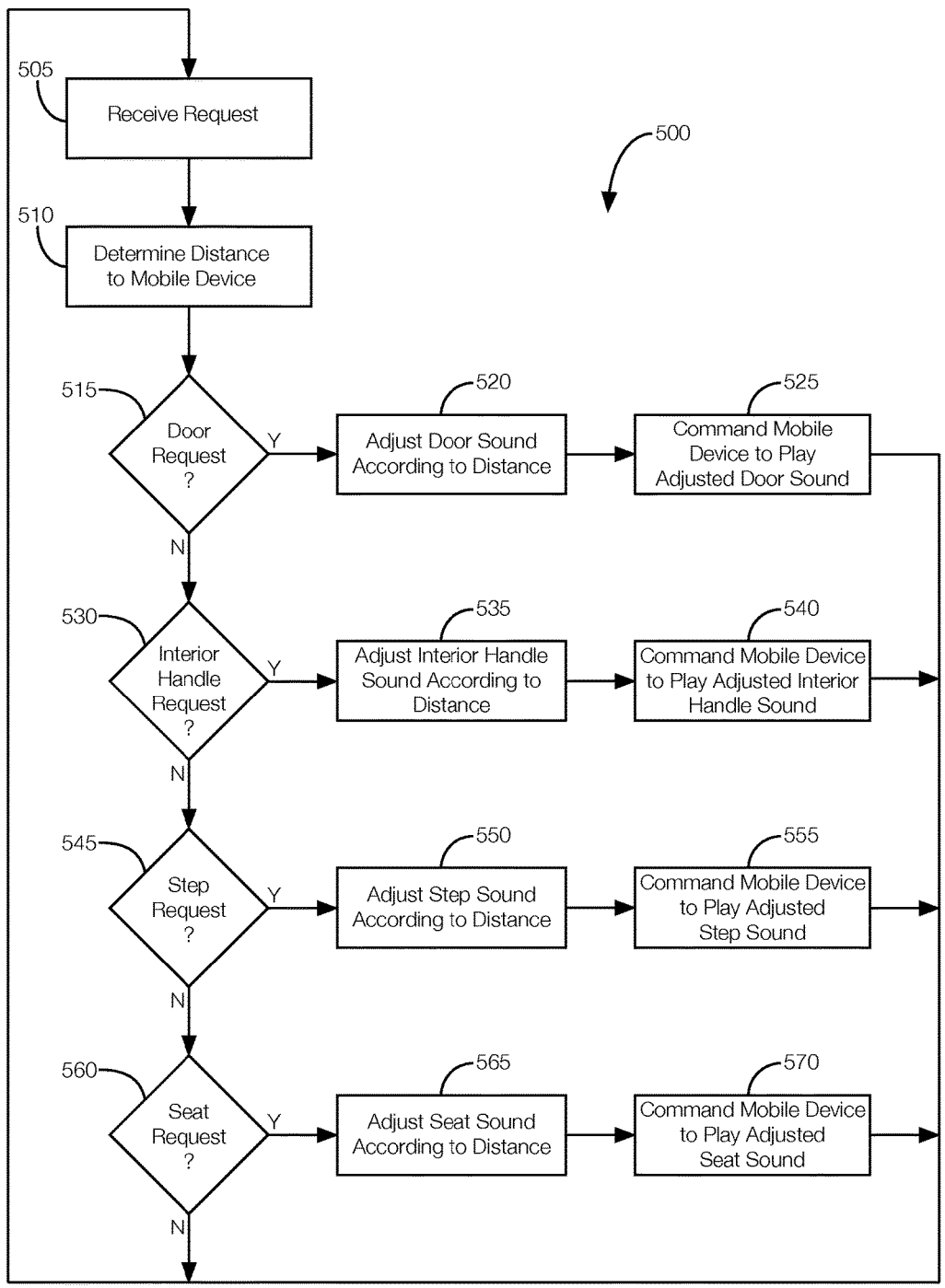
FIG. 5 is a flowchart of an example process that may be executed by the system to modulate various sounds before transmitting the modulated sounds to the mobile device for playback through the mobile device.

FIG. 5 is a flowchart of another example process 500 that may be executed by the system 145 to, e.g., play sounds to help the passenger enter the host vehicle 100. In this process 500, the sounds are played by the mobile device 170 and are adjusted according to the distance of the mobile device 170 to various vehicle components. The process 500 may begin prior to the passenger entering the host vehicle 100.

At block 505, the system 145 receives a request. The request may include a door request, an interior handle request, a step request, and a seat request. The request may be transmitted from the mobile device 170 and received at the host vehicle 100 via the communication interface 150. The communication interface 150 may forward the request to the processor 160 over the communication network 165. In some instances, instead of coming from the mobile device 170, the request is a signal output by one of the sensors 155 indicating that a passenger is located near the host vehicle 100 and would like to enter the host vehicle 100, located near one of the vehicle components 105, or the like.

At block 510, the system 145 determines a distance of the mobile device 170 relative to one or more vehicle components such as the vehicle doors 110, the vehicle floor 130, the interior vehicle handle 140, the vehicle seat 135, etc. For instance, the communication interface 150 or processor 160 may measure the signal strength of the mobile device 170 relative to the communication interface 150. A stronger signal strength may indicate that the mobile device 170 is closer to communication interface 150 and a weaker signal strength may indicate that the mobile device 170 is further away from the communication interface 150. Since each signal strength may indicate a particular distance of the mobile device 170 from the communication interface 150, and because each vehicle component may be a different distance from the communication interface 150, the signal strength may indicate the distance of the mobile device 170 to particular vehicle components. Additionally, or alternatively, the location of the mobile device 170 relative to one or more vehicle components may be determined according to the signals output by the sensors 155. The processor 160 may determine the distance, therefore, according to the signals output by the sensor, the signal strength of the wireless communications between the mobile device 170 and the communication interface 150, or a combination of both.

At decision block 515, the system 145 determines if the request is a door request. The door request may indicate that the passenger is trying to locate the vehicle door 110. If the processor 160 determines that the request is a door request, the process 500 proceeds to block 520. Otherwise, the process 500 proceeds to block 530.

At block 520, the system 145 adjusts the door sound according to the distance determined at block 510. That is, the processor 160 may adjust the sound so that it reflects the distance of the mobile device 170 to the vehicle door 110. In other words, the sound may be adjusted to sound as if it were being played by the appropriate speaker (e.g., the door speaker 105A) in the host vehicle 100 although it is actually being played via the mobile device 170. In one possible approach, the processor 160 may adjust the sound by commanding the volume of the sound to be lower when the mobile device 170 is further away from the vehicle door 110 and the volume of the sound to be higher when the mobile device 170 is closer to the vehicle door 110. To the extent the sound is to be played repeatedly via the mobile device 170, the volume of the sound may be increased or decreased in real time based on whether the mobile device 170 is moving toward or away from, respectively, the vehicle door 110.

At block 525, the system 145 commands the mobile device 170 to play the adjusted sound. For instance, the processor 160 may command the communication interface 150 to transmit the adjusted sound to the mobile device 170 with instructions for playback via the mobile device 170. The process 500 may proceed to block 505 after the adjusted sounds are sent to the mobile device 170 for playback so that additional requests transmitted from the mobile device 170 may be received and processed.

At decision block 530, the system 145 determines if the request is an interior handle request. The interior handle request may indicate that the passenger is trying to enter the host vehicle 100 through the vehicle door 110 and would like the assistance of the interior vehicle handle 140. If the processor 160 determines that the request is an interior handle request, the process 500 proceeds to block 535. Otherwise, the process 500 proceeds to block 545.

At block 535, the system 145 adjusts the interior handle sound according to the distance determined at block 510. That is, the processor 160 may adjust the sound so that it reflects the distance of the mobile device 170 to the interior vehicle handle 140. In other words, the sound may be adjusted to sound as if it were being played by the appropriate speaker (e.g., the interior handle speaker 105D) in the host vehicle 100 although it is actually being played via the mobile device 170. In one possible approach, the processor 160 may adjust the sound by commanding the volume of the sound to be lower when the mobile device 170 is further away from the interior vehicle handle 140 and the volume of the sound to be higher when the mobile device 170 is closer to the interior vehicle handle 140. To the extent the sound is to be played repeatedly via the mobile device 170, the volume of the sound may be increased or decreased in real time based on whether the mobile device 170 is moving toward or away from, respectively, the interior vehicle handle 140.

At block 540, the system 145 commands the mobile device 170 to play the adjusted sound. For instance, the processor 160 may command the communication interface 150 to transmit the adjusted sound to the mobile device 170 with instructions for playback via the mobile device 170. The process 500 may proceed to block 505 after the adjusted sounds are sent to the mobile device 170 for playback so that additional requests transmitted from the mobile device 170 may be received and processed.

At decision block 545, the system 145 determines if the request is a step request. The step request may indicate that the passenger is ready to enter the host vehicle 100 but is unsure where to step. The step request may also indicate that the passenger is unsure how to get to his or her seat. If the processor 160 determines that the request is a step request, the process 500 proceeds to block 550. Otherwise, the process 500 proceeds to block 560.

At block 550, the system 145 adjusts the step sound according to the distance determined at block 510. That is, the processor 160 may adjust the sound so that it reflects the distance of the mobile device 170 to the area of the vehicle floor 130 where the next floor speaker 105B is located. In other words, the sound may be adjusted to sound as if it were being played by the appropriate speaker (e.g., the next floor speaker 105B between the passenger and the passenger's seat) in the host vehicle 100 although it is actually being played via the mobile device 170. In one possible approach, the processor 160 may adjust the sound by commanding the volume of the sound to be lower when the mobile device 170 is further away from the next floor speaker 105B and the volume of the sound to be higher when the mobile device 170 is closer to the next floor speaker 105B. To the extent the sound is to be played repeatedly via the mobile device 170, the volume of the sound may be increased or decreased in real time based on whether the mobile device 170 is moving toward or away from, respectively, the next floor speaker 105B.

At block 555, the system 145 commands the mobile device 170 to play the adjusted sound. For instance, the processor 160 may command the communication interface 150 to transmit the adjusted sound to the mobile device 170 with instructions for playback via the mobile device 170. The process 500 may proceed to block 505 after the adjusted sounds are sent to the mobile device 170 for playback so that additional requests transmitted from the mobile device 170 may be received and processed.

At decision block 560, the system 145 determines if the request is a seat request. The seat request may indicate that the passenger has entered the host vehicle 100 and is trying to find his or her seat. If the processor 160 determines that the request is a seat request, the process 500 proceeds to block 565. Otherwise, the process 500 proceeds to block 505.

At block 565, the system 145 adjusts the seat sound according to the distance determined at block 510. That is, the processor 160 may adjust the sound so that it reflects the distance of the mobile device 170 to the vehicle seat 135 where the passenger will sit. In other words, the sound may be adjusted to sound as if it were being played by the appropriate speaker (e.g., one or more of the seat speakers 105C) in the host vehicle 100 although it is actually being played via the mobile device 170. In one possible approach, the processor 160 may adjust the sound by commanding the volume of the sound to be lower when the mobile device 170 is further away from the vehicle seat 135 and the volume of the sound to be higher when the mobile device 170 is closer to the vehicle seat 135. To the extent the sound is to be played repeatedly via the mobile device 170, the volume of the sound may be increased or decreased in real time based on whether the mobile device 170 is moving toward or away from, respectively, the vehicle seat 135.

At block 570, the system 145 commands the mobile device 170 to play the adjusted sound. For instance, the processor 160 may command the communication interface 150 to transmit the adjusted sound to the mobile device 170 with instructions for playback via the mobile device 170. The process 500 may proceed to block 505 after the adjusted sounds are sent to the mobile device 170 for playback so that additional requests transmitted from the mobile device 170 may be received and processed.

Figure 6:
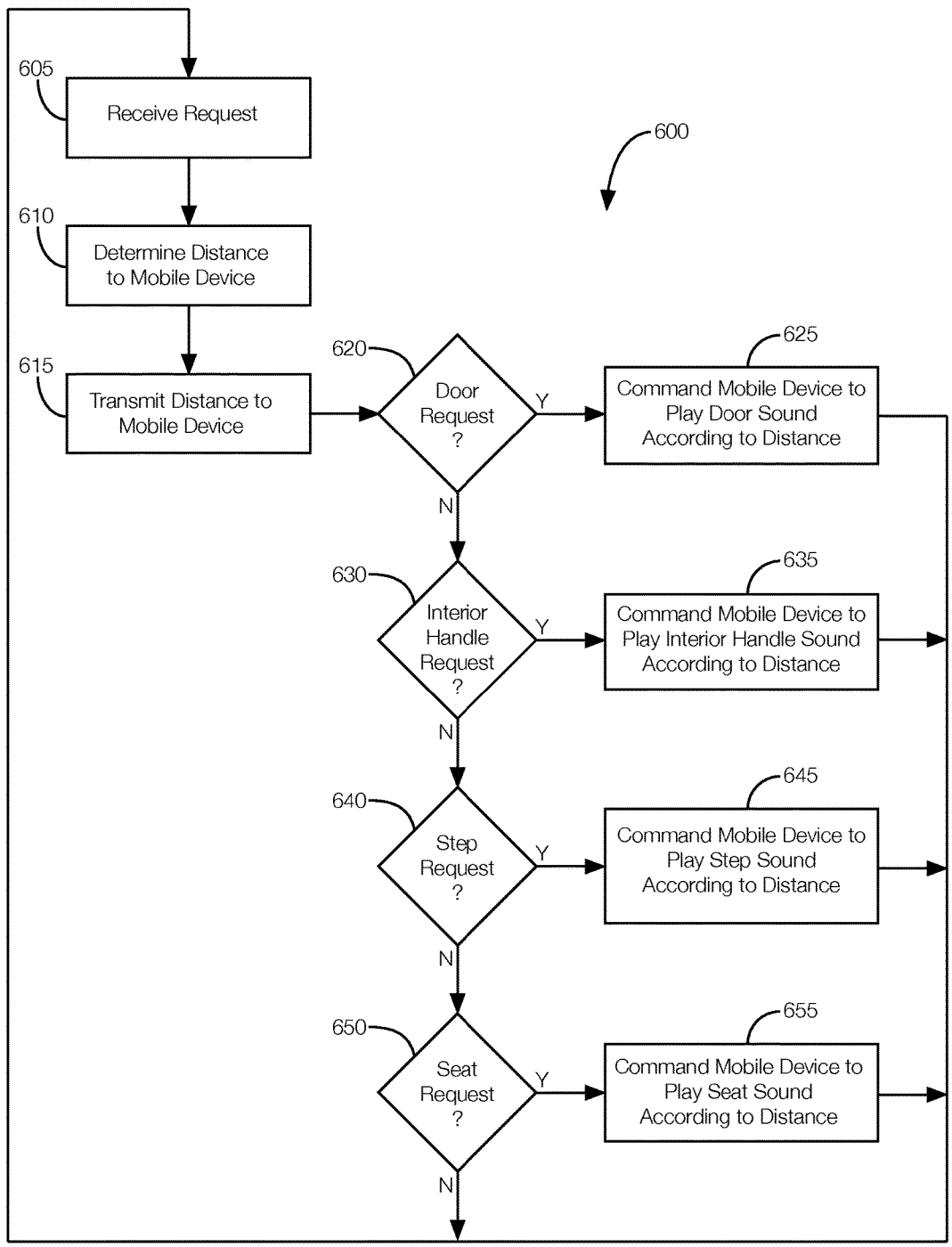
FIG. 6 is a flowchart of an example process that may be executed by the system to transmit sounds to the mobile device with instructions for modulating the sound at the mobile device before playback on the mobile device.

FIG. 6 is a flowchart of another example process 600 that may be executed by the system 145 to, e.g., play sounds to help the passenger enter the host vehicle 100. In this process 600, the sounds are played by the mobile device 170 and are adjusted according to the distance of the mobile device 170 to various vehicle components. The process 600 may begin prior to the passenger entering the host vehicle 100 and may continue to execute until, e.g., all passengers are seated in the host vehicle 100.

At block 605, the system 145 receives a request. The request may include a door request, an interior handle request, a step request, and a seat request. The request may be transmitted from the mobile device 170 and received at the host vehicle 100 via the communication interface 150. The communication interface 150 may forward the request to the processor 160 over the communication network 165. In some instances, instead of coming from the mobile device 170, the request is a signal output by one of the sensors 155 indicating that a passenger is located near the host vehicle 100 and would like to enter the host vehicle 100, located near one of the vehicle components 105, or the like.

At block 610, the system 145 determines a distance of the mobile device 170 relative to one or more vehicle components such as the vehicle doors 110, the vehicle floor 130, the interior vehicle handle 140, the vehicle seat 135, etc. For instance, the communication interface 150 or processor 160 may measure the signal strength of the mobile device 170 relative to the communication interface 150. A stronger signal strength may indicate that the mobile device 170 is closer to communication interface 150 and a weaker signal strength may indicate that the mobile device 170 is further away from the communication interface 150. Since each signal strength may indicate a particular distance of the mobile device 170 from the communication interface 150, and because each vehicle component may be a different distance from the communication interface 150, the signal strength may indicate the distance of the mobile device 170 to particular vehicle components. Additionally, or alternatively, the location of the mobile device 170 relative to one or more vehicle components may be determined according to the signals output by the sensors 155. The processor 160 may determine the distance, therefore, according to the signals output by the sensor, the signal strength of the wireless communications between the mobile device 170 and the communication interface 150, or a combination of both.

At block 615, the system 145 transmits the distance to the mobile device 170. For instance, the processor 160 may command the communication interface 150 to wirelessly transmit a signal representing the distance to the mobile device 170.

At decision block 620, the system 145 determines if the request is a door request. The door request may indicate that the passenger is trying to locate the vehicle door 110. If the processor 160 determines that the request is a door request, the process 600 proceeds to block 625. Otherwise, the process 600 proceeds to block 630.

At block 625, the system 145 commands the mobile device 170 to play the door sound according to the distance. For instance, the processor 160 may command the communication interface 150 to transmit the sound to the mobile device 170 with instructions for playback via the mobile device 170. The instructions may further include instructions for the mobile device 170 to adjust the sound according to the distance. The adjusted sound may sound as if the passenger were hearing it directly from the door speaker 105A as opposed to through the mobile device 170 given the distance of the mobile device 170 to the vehicle door 110. The process 600 may proceed to block 605 after the adjusted sounds are sent to the mobile device 170 for playback so that additional requests transmitted from the mobile device 170 may be received and processed.

At decision block 630, the system 145 determines if the request is an interior handle request. The interior handle request may indicate that the passenger is trying to enter the host vehicle 100 through the vehicle door 110 and would like the assistance of the interior vehicle handle 140. If the processor 160 determines that the request is an interior handle request, the process 600 proceeds to block 635. Otherwise, the process 600 proceeds to block 640.

At block 635, the system 145 commands the mobile device 170 to play the interior handle sound according to the distance. For instance, the processor 160 may command the communication interface 150 to transmit the sound to the mobile device 170 with instructions for playback via the mobile device 170. The instructions may further include instructions for the mobile device 170 to adjust the sound according to the distance. The adjusted sound may sound as if the passenger were hearing it directly from the interior handle speaker 105D as opposed to through the mobile device 170 given the distance of the mobile device 170 to the interior vehicle handle 140. The process 600 may proceed to block 605 after the adjusted sounds are sent to the mobile device 170 for playback so that additional requests transmitted from the mobile device 170 may be received and processed.

At decision block 640, the system 145 determines if the request is a step request. The step request may indicate that the passenger is ready to enter the host vehicle 100 but is unsure where to step. The step request may also indicate that the passenger is unsure how to get to his or her seat. If the processor 160 determines that the request is a step request, the process 600 proceeds to block 645. Otherwise, the process 600 proceeds to block 650.

At block 645, the system 145 commands the mobile device 170 to play the floor sound according to the distance. For instance, the processor 160 may command the communication interface 150 to transmit the sound to the mobile device 170 with instructions for playback via the mobile device 170. The instructions may further include instructions for the mobile device 170 to adjust the sound according to the distance of the mobile device 170 to the next floor speaker 105B between the mobile device 170 and the vehicle seat 135 where the passenger will sit. The adjusted sound may sound as if the passenger were hearing it directly from the next floor speaker 105B as opposed to through the mobile device 170 given the distance of the mobile device 170 to the next floor speaker 105B. The process 600 may proceed to block 605 after the adjusted sounds are sent to the mobile device 170 for playback so that additional requests transmitted from the mobile device 170 may be received and processed.

At decision block 650, the system 145 determines if the request is a seat request. The seat request may indicate that the passenger has entered the host vehicle 100 and is trying to find his or her seat. If the processor 160 determines that the request is a seat request, the process 600 proceeds to block 650. Otherwise, the process 600 proceeds to block 605.

At block 655, the system 145 commands the mobile device 170 to play the seat sound according to the distance. For instance, the processor 160 may command the communication interface 150 to transmit the sound to the mobile device 170 with instructions for playback via the mobile device 170. The instructions may further include instructions for the mobile device 170 to adjust the sound according to the distance of the mobile device 170 to the vehicle seat 135. The adjusted sound may sound as if the passenger were hearing it directly from the seat speaker 105C as opposed to through the mobile device 170 given the distance of the mobile device 170 to the vehicle seat 135. The process 600 may proceed to block 605 after the adjusted sounds are sent to the mobile device 170 for playback so that additional requests transmitted from the mobile device 170 may be received and processed.

Figure 7:
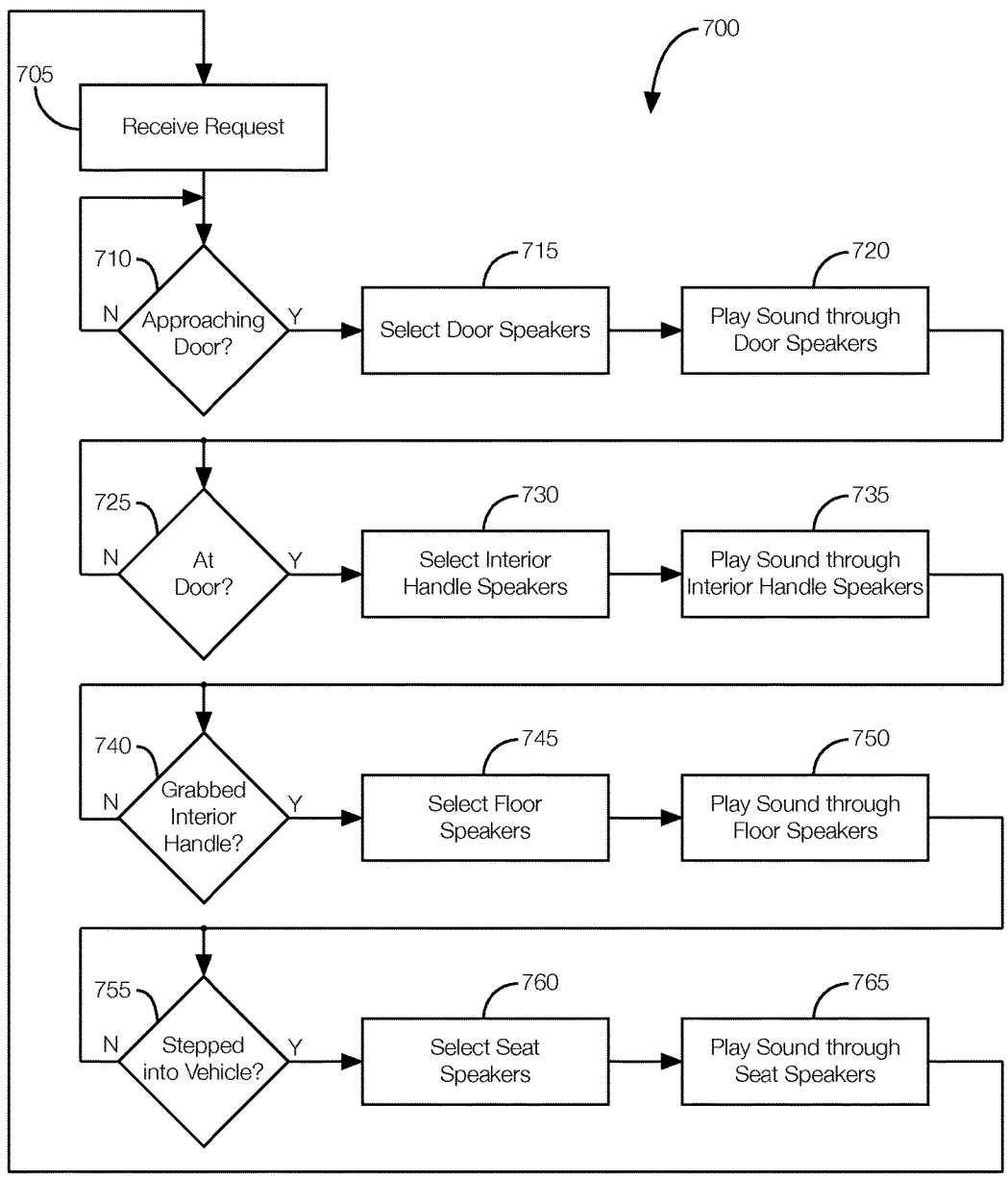
FIG. 7 is a flowchart of an example process that may be executed by the system to automatically play sounds via the vehicle speakers according to the location of the passenger.

FIG. 7 is a flowchart of another example process 700 that may be executed by the system 145 to, e.g., play sounds in the host vehicle 100 at various times to help the passenger enter the host vehicle 100. The process 700 may begin prior to the passenger entering the host vehicle 100 and may continue to execute until, e.g., all passengers are seated in the host vehicle 100.

At block 705, the system 145 receives a request. The request may include, e.g., a door request or another request that indicates that the passenger is ready to enter the host vehicle 100 and find his or her seat. The request may be transmitted from the mobile device 170 and received at the host vehicle 100 via the communication interface 150. The communication interface 150 may forward the request to the processor 160 over the communication network 165. In some instances, instead of coming from the mobile device 170, the request is a signal output by one of the sensors 155 indicating that a passenger is located near the host vehicle 100 and would like to enter the host vehicle 100, located near one of the vehicle components 105, or the like.

At decision block 710, the system 145 determines if the passenger is approaching the vehicle door 110. The processor 160 may determine that the passenger is approaching the vehicle door 110 based on signals output by the sensors 155. If the processor 160 determines that the passenger is approaching the vehicle door 110, the process 700 proceeds to block 715. Otherwise, the process 700 continues to execute block 710 until the passenger is detected approaching the vehicle door 110.

At block 715, the system 145 selects one or more of the door speakers 105A. For instance, the processor 160 may select the door speaker 105A incorporated into a door panel 115, an exterior door handle 120, around a door opening 125, or any combination thereof.

At block 720, the system 145 plays the sounds through the selected door speakers 105A. For instance, the processor 160 may output signals representing the sounds to the selected door speakers 105A, which may respond by vibrating according to the signals output by the processor 160. The process 700 may proceed to block 725 after the sounds are played through the selected door speakers 105A so that the processor 160 may reevaluate the location of the passenger and select the next speaker or set of speakers to help the passenger locate his or her vehicle seat 135.

At decision block 725, the system 145 determines if the passenger is at the vehicle door 110 and would benefit from the assistance of the interior vehicle handle 140. The processor 160 may make such a determination based on signals output by the sensors 155 indicating that the passenger is at the door and possibly reaching for the interior vehicle handle 140. If the processor 160 determines that the passenger is at the door, the process 700 proceeds to block 730. Otherwise, the process 700 continues to execute block 725 until the passenger arrives at the vehicle door 110.

At block 730, the system 145 selects one or more of the interior handle speakers 105D. For instance, the processor 160 may select one or more interior handle speakers 105D incorporated into an interior vehicle handle 140 located near the vehicle door 110, a seat armrest, or any combination thereof.

At block 735, the system 145 plays the sounds through the selected interior handle speakers 105D. For instance, the processor 160 may output signals representing the sounds to the selected interior handle speakers 105D, which may respond by vibrating according to the signals output by the processor 160. The process 700 may proceed to block 740 after the sounds are played through the selected interior handle speakers 105D so that the processor 160 may reevaluate the location of the passenger and select the next speaker or set of speakers to help the passenger locate his or her vehicle seat 135.

At decision block 740, the system 145 determines if the passenger has grabbed the interior vehicle handle 140 and is ready to enter the host vehicle 100. The processor 160 may determine whether the passenger has grabbed the interior vehicle handle 140 based on signals output by the sensors 155. If the processor 160 determines that the passenger has grabbed the interior vehicle handle 140, the process 700 proceeds to block 745. Otherwise, the process 700 continues to execute block 740 until the passenger grabs the interior vehicle handle 140.

At block 745, the system 145 selects one or more of the floor speakers 105B. For instance, the processor 160 may select one or more floor speakers 105B incorporated into the vehicle floor 130. The floor speakers 105B may be selected individually, collectively, or in a particular sequence (e.g., starting with the floor speaker 105B closest to the vehicle door 110 and ending with the floor speaker 105B closest to the passenger's vehicle seat 135).

At block 750, the system 145 plays the sounds through the selected floor speakers 105B. For instance, the processor 160 may output signals representing the sounds to the selected floor speakers 105B, which may respond by vibrating according to the signals output by the processor 160. The process 700 may proceed to block 755 after the sounds are played through the selected floor speakers 105B so that the processor 160 may reevaluate the location of the passenger and select the next speaker or set of speakers to help the passenger locate his or her vehicle seat 135.

At decision block 755, the system 145 determines if the passenger has stepped into the host vehicle 100 and is trying to find his or her vehicle seat 135. The processor 160 may determine that the passenger has stepped into the host vehicle 100 based on signals output by the sensors 155. If the processor 160 determines that the passenger has stepped into the host vehicle 100, the process 700 proceeds to block 745. Otherwise, the process 700 continues to execute block 755 until the passenger steps into the host vehicle 100.

At block 760, the system 145 selects one or more of the seat speakers 105C. For instance, the processor 160 may select one or more seat speakers 105C incorporated into the passenger's vehicle seat 135.

At block 765, the system 145 plays the sounds through the selected seat speakers 105C. For instance, the processor 160 may output signals representing the sounds to the selected seat speakers 105C, which may respond by vibrating according to the signals output by the processor 160. The process 700 may proceed to block 705 after the sounds are played through the selected seat speakers 105C so that additional requests transmitted from the mobile device 170 may be received and processed.

Figure 8:
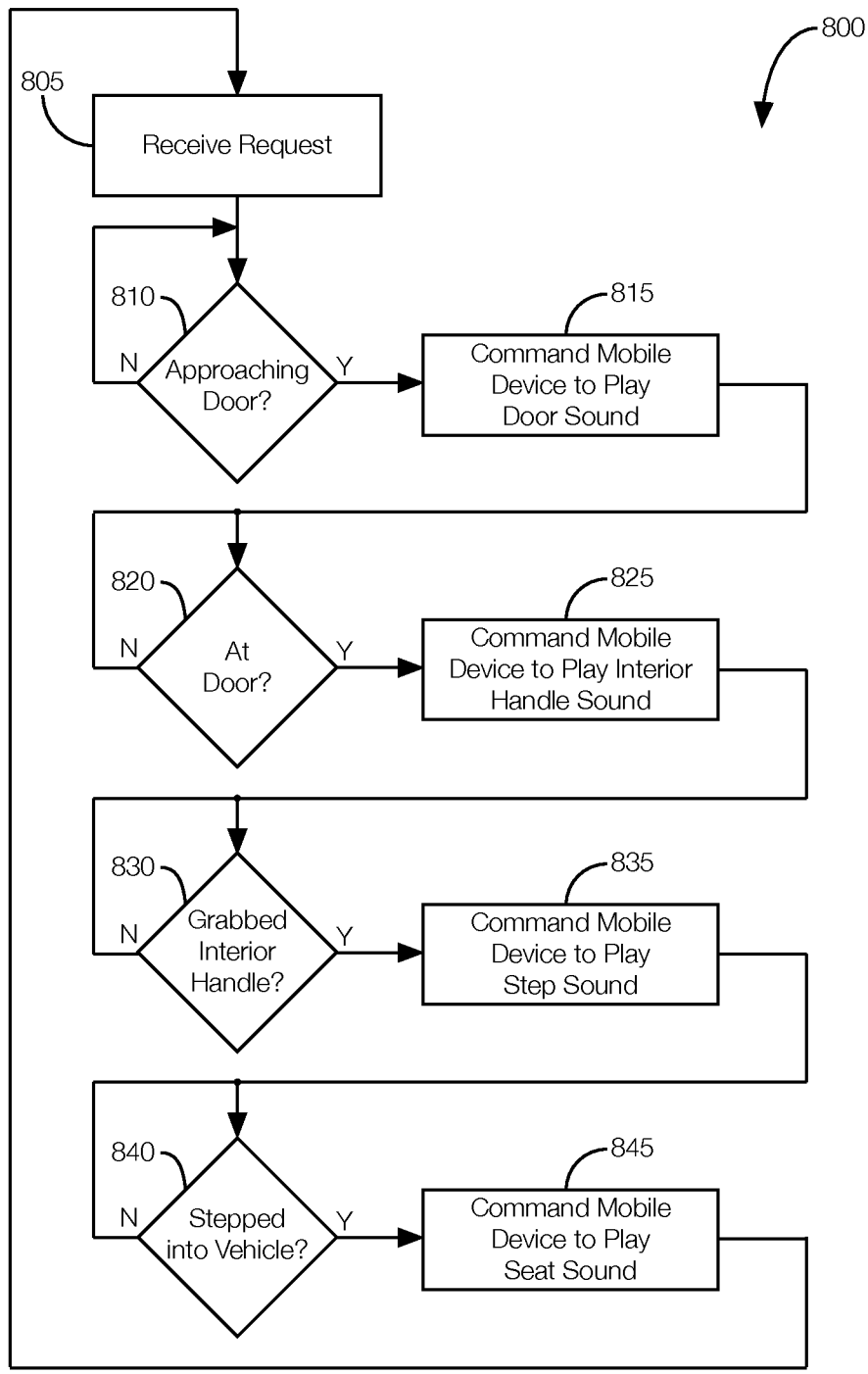
FIG. 8 is a flowchart of an example process that may be executed by the system to automatically command the remote device to play sounds according to the location of the passenger.

FIG. 8 is a flowchart of another example process 800 that may be executed by the system 145 to, e.g., play sounds via the mobile device 170 at various times to help the passenger enter the host vehicle 100. The process 800 may begin prior to the passenger entering the host vehicle 100 and may continue to execute until, e.g., all passengers are seated in the host vehicle 100.

At block 805, the system 145 receives a request. The request may include, e.g., a door request or another request that indicates that the passenger is ready to enter the host vehicle 100 and find his or her seat. The request may be transmitted from the mobile device 170 and received at the host vehicle 100 via the communication interface 150. The communication interface 150 may forward the request to the processor 160 over the communication network 165. In some instances, instead of coming from the mobile device 170, the request is a signal output by one of the sensors 155 indicating that a passenger is located near the host vehicle 100 and would like to enter the host vehicle 100, located near one of the vehicle components 105, or the like.

At decision block 810, the system 145 determines if the passenger is approaching the vehicle door 110. The processor 160 may determine that the passenger is approaching the vehicle door 110 based on signals output by the sensors 155. If the processor 160 determines that the passenger is approaching the vehicle door 110, the process 800 proceeds to block 815. Otherwise, the process 800 continues to execute block 810 until the passenger is detected approaching the vehicle door 110.

At block 815, the system 145 commands the mobile device 170 to play the door sound. For instance, the processor 160 may command the communication interface 150 to transmit the sound to the mobile device 170 with instructions for playback via the mobile device 170. The instructions may further include instructions for the mobile device 170 to adjust the sound according to the distance of the mobile device 170 to the vehicle door 110 so that it may sound as if the passenger were hearing it directly from the door speaker 105A as opposed to through the mobile device 170 given the distance of the mobile device 170 to the vehicle door 110. Rather than instruct the mobile device 170 to adjust the sound, the processor 160 may transmit an adjusted door sound to the mobile device 170 at block 815. The process 800 may proceed to block 820 after the mobile device 170 is commanded to play the door sound.

At decision block 820, the system 145 determines if the passenger is at the vehicle door 110 and would benefit from the assistance of the interior vehicle handle 140. The processor 160 may make such a determination based on signals output by the sensors 155 indicating that the passenger is at the door and possibly reaching for the interior vehicle handle 140. If the processor 160 determines that the passenger is at the door, the process 800 proceeds to block 825. Otherwise, the process 800 continues to execute block 820 until the passenger arrives at the vehicle door 110.

At block 825, the system 145 commands the mobile device 170 to play the interior handle sound. For instance, the processor 160 may command the communication interface 150 to transmit the sound to the mobile device 170 with instructions for playback via the mobile device 170. The instructions may further include instructions for the mobile device 170 to adjust the sound according to the distance of the mobile device 170 to the interior vehicle handle 140 so that it may sound as if the passenger were hearing it directly from the interior handle speaker 105D as opposed to through the mobile device 170 given the distance of the mobile device 170 to the interior vehicle handle 140. Rather than instruct the mobile device 170 to adjust the sound, the processor 160 may transmit an adjusted interior handle sound to the mobile device 170 at block 825. The process 800 may proceed to block 830 after the mobile device 170 is commanded to play the interior vehicle sound.

At decision block 830, the system 145 determines if the passenger has grabbed the interior vehicle handle 140 and is ready to enter the host vehicle 100. The processor 160 may determine whether the passenger has grabbed the interior vehicle handle 140 based on signals output by the sensors 155. If the processor 160 determines that the passenger has grabbed the interior vehicle handle 140, the process 800 proceeds to block 835. Otherwise, the process 800 continues to execute block 830 until the passenger grabs the interior vehicle handle 140.

At block 835, the system 145 commands the mobile device 170 to play the floor sound. For instance, the processor 160 may command the communication interface 150 to transmit the floor sound to the mobile device 170 with instructions for playback via the mobile device 170. The instructions may further include instructions for the mobile device 170 to adjust the sound according to the distance of the mobile device 170 to the next floor speaker 105B between the mobile device 170 and the vehicle seat 135 where the passenger will sit. The adjusted sound may sound as if the passenger were hearing it directly from the next floor speaker 105B as opposed to through the mobile device 170 given the distance of the mobile device 170 to the next floor speaker 105B. Rather than instruct the mobile device 170 to adjust the sound, the processor 160 may transmit an adjusted interior handle sound to the mobile device 170 at block 835. The process 800 may proceed to block 840 after the mobile device 170 is commanded to play the floor sound.

At decision block 840, the system 145 determines if the passenger has stepped into the host vehicle 100 and is trying to find his or her vehicle seat 135. The processor 160 may determine that the passenger has stepped into the host vehicle 100 based on signals output by the sensors 155. If the processor 160 determines that the passenger has stepped into the host vehicle 100, the process 800 proceeds to block 845. Otherwise, the process 800 continues to execute block 840 until the passenger steps into the host vehicle 100.

At block 845, the system 145 commands the mobile device 170 to play the seat sound. For instance, the processor 160 may command the communication interface 150 to transmit the sound to the mobile device 170 with instructions for playback via the mobile device 170. The instructions may further include instructions for the mobile device 170 to adjust the sound according to the distance of the mobile device 170 to the vehicle seat 135, and the adjusted sound may sound as if the passenger were hearing it directly from the seat speaker 105C as opposed to through the mobile device 170 given the distance of the mobile device 170 to the vehicle seat 135. Rather than instruct the mobile device 170 to adjust the sound, the processor 160 may transmit an adjusted seat sound to the mobile device 170 at block 845. The process 800 may proceed to block 805 after the mobile device 170 is commanded to play the floor sound so that additional requests may be considered and processed.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A vehicle system, in a host vehicle, comprising:
   a plurality of speakers, each associated with one of a plurality of vehicle components, wherein at least one of the plurality of vehicle components includes a vehicle door and wherein the plurality of speakers includes a door speaker associated with the vehicle door; and
   a processor programmed to select the door speaker to play a sound associated with the vehicle door,
   wherein the door speaker is selected to play the sound as a result of detecting a location of a passenger outside the host vehicle near the vehicle door.

2. The vehicle system of claim 1, wherein the processor is programmed to select the door speaker to play the sound associated with the vehicle door as a result of detecting the location of the passenger near the door and further in response to a door request transmitted from a mobile device.

3. The vehicle system of claim 1, wherein the plurality of speakers further includes a floor speaker, the plurality of vehicle components further includes a vehicle floor, and wherein the processor is programmed to select the floor speaker to play the sound associated with the vehicle floor in response to a step request transmitted from a mobile device and after the passenger opens the vehicle door.

4. The vehicle system of claim 3, wherein the plurality of speakers further includes a seat speaker, the plurality of vehicle components further includes a vehicle seat, and wherein the processor is programmed to select the seat speaker to play the sound associated with the vehicle seat in response to a seat request transmitted from a mobile device and after the passenger steps onto the vehicle floor.

5. The vehicle system of claim 1, wherein the plurality of speakers further includes an interior handle speaker, the plurality of vehicle components further includes an interior handle, and wherein the processor is programmed to select the interior handle speaker to play the sound associated with the interior handle in response to an interior handle request transmitted from a mobile device.

6. The vehicle system of claim 5, wherein the processor is programmed to select the door speaker to play the sound associated with a vehicle door before selecting the interior handle speaker to play the sound associated with an interior handle.

7. The vehicle system of claim 4, wherein the processor is programmed to select the floor speaker to play the sound associated with a vehicle floor before selecting the seat speaker to play the sound associated with a vehicle seat.

8. The vehicle system of claim 1, wherein the processor is programmed to command a communication interface to transmit the sound to a mobile device for playback on the mobile device.

9. The vehicle system of claim 8, wherein the processor is programmed to determine a distance of the mobile device to one of the plurality of vehicle components and transmit, via the communication interface, a command to the mobile device to adjust the sound according to the distance.

10. The vehicle system of claim 9, wherein commanding the mobile device to adjust the sound includes commanding the mobile device to increase a volume of the sound as the mobile device moves closer to one of the plurality of vehicle components and decrease a volume of the sound as the mobile device moves further from one of the plurality of vehicle components.

11. A method comprising:
    selecting, in a vehicle, a door speaker, associated with a vehicle door, from among a plurality of speakers to play a sound associated with the vehicle door, wherein the door speaker is selected to play the sound as a result of detecting a location of a passenger outside the vehicle near the vehicle door and further as a result of receiving a plurality of requests received from a mobile device; and
    playing the sound via the door speaker as a result of selecting the door speaker.

12. The method of claim 11, wherein the plurality of requests includes a door request and wherein selecting the door speaker includes selecting the door speaker to play the sound associated with a vehicle door as a result of detecting the location of the passenger near the door and further in response to receiving the door request.

13. The method of claim 11, wherein the plurality of requests includes a step request and the method further comprising selecting a floor speaker, from among the plurality of speakers, to play the sound associated with a vehicle floor in response to receiving the step request and after the passenger opens the vehicle door.

14. The method of claim 13, wherein the plurality of requests includes a seat request and the method further comprising selecting a seat speaker, from among the plurality of speakers, to play the sound associated with a vehicle seat in response to receiving the seat request and after the passenger steps onto the vehicle floor.

15. The method of claim 11, wherein the plurality of requests includes an interior handle request and the method further comprising selecting an interior handle speaker, from among the plurality of speakers, to play the sound associated with an interior handle in response to receiving the interior handle request.

16. The method of claim 11, further comprising transmitting the sound to the mobile device for playback on the mobile device.

17. The method of claim 16, further comprising:
determining a distance of the mobile device to one of the plurality of vehicle components; and
transmitting a command to the mobile device to adjust the sound according to the distance.

18. The method of claim 17, wherein commanding the mobile device to adjust the sound includes commanding the mobile device to increase a volume of the sound as the mobile device moves closer to one of the plurality of vehicle components and decrease a volume of the sound as the mobile device moves further from one of the plurality of vehicle components.

19. A vehicle system, in a host vehicle, comprising:
a plurality of speakers, each associated with one of a plurality of vehicle components, wherein the plurality of vehicle components includes a vehicle door and wherein the plurality of speakers includes a door speaker associated with the vehicle door; and
a processor programmed to select the door speaker to play a sound associated with the vehicle door,
wherein the door speaker is selected to play the sound as a result of receiving a door request associated with the vehicle door, wherein the door request is received as a result of detecting a location of a passenger near the door.

20. The vehicle system of claim 19, wherein the door request is received from at least one of a vehicle sensor and a mobile device.

* * * * *